No. 835,833. PATENTED NOV. 13, 1906.
J. E. RUSSELL.
CHART FOR KEEPING RECORDS OF BRIDGE WHIST.
APPLICATION FILED APR. 14, 1906.

2 SHEETS—SHEET 1.

Fig. 1.

Witnesses
Inventor
James E. Russell
By his Attorney

No. 835,833.

PATENTED NOV. 13, 1906.

J. E. RUSSELL.

CHART FOR KEEPING RECORDS OF BRIDGE WHIST.

APPLICATION FILED APR. 14, 1906.

2 SHEETS—SHEET 2.

UNITED STATES PATENT OFFICE.

JAMES E. RUSSELL, OF NEW YORK, N. Y.

CHART FOR KEEPING RECORDS OF BRIDGE-WHIST.

No. 835,833.　　　Specification of Letters Patent.　　　Patented Nov. 13, 1906.

Application filed April 14, 1906. Serial No. 311,651.

*To all whom it may concern:*

Be it known that I, JAMES E. RUSSELL, a citizen of the United States, residing in the city of New York, in the borough of Brooklyn, county of Kings, and State of New York, have invented a new and useful Improvement in a Chart for Keeping a Record of Bridge-Whist, of which the following is a specification.

This invention relates to a bridge-whist record adapted for use by those desiring to secure a correct and reliable index to individual skill in connection with partnership play and the results of the game or games. To the present time such record or records are limited to the results of partnership play in the count.

The invention consists of an arrangement of the record, which will be hereinafter more fully set forth.

In the drawings, Figure 1 is a view of the obverse side of the record embodying the features of the invention. Fig. 2 is a similar view of the reverse side of the record.

Similar letters of reference are employed to indicate similar parts in the views.

The record consists of a strip or sheet of suitable paper having such dimensions in size or ruling as will adapt it to receive the matter printed thereon. The record is divided into three parts on its obverse side—an individual record *a*, a series of partnership records *b b b b*, and an associate supplementary specification *c*, referring to special features of the game. The individual record occupies one side of the obverse strip or sheet of paper, the serial partnership record the other or remaining side of part, arranged so that each one of the series will lie immediately above the special features or corresponding section of the record *c*.

The column in which appear the words "Series number" refers to the series number in the remaining columns devoted to the series of partnership records and which shows at once in what series any certain play or feature of individual play or incident connected therewith transpired and the individual party to the transaction.

The record also includes spaces to indicate a succeeding number of deals in each and all the series played, as well as spaces devoted to particular features of the individual play in the series. The total number of such succeeding deals invariably equal the total number of makes in any or all of the series. There has also been incorporated in this record the usual explanatory statement or reference as to values. On the reverse side of this record, Fig. 2, is the arrangement of a summary and analysis of the play of each individual participating in any or all of the series on the obverse side, Fig. 1, and a summary of such series. The part *e* upon the left side is devoted to a summary of all deals and makes in the series. The greater allotment of the remaining space is intended for a separate entry and analysis of all the different makes, the times of each, their character, and the reason governing each selection. The remaining portion is for the tabulating of the names of the parties and their personal or individual record. Immediately below this and comprising all the remaining portion of the space *k* is the part or section devoted to the estimating of percentages, if desired, and remarks germane or pertinent to the completed series; but I do not limit myself to the precise arrangement shown, as the columns may be transposed without departing from the spirit of my invention.

Having thus fully described the invention, what is claimed as new is—

1. A bridge-whist record having under the appropriate headings or statement of subject-matter, in ruled columns or spaces, at one end or part thereof, an individual record relating to each deal and the results of individual play, and extending on the same side and in the remaining part, the results, and the results of partnership play in any number or series of games, with special features of the plays or games under each series, substantially as described.

2. A record of the character described consisting of a series of spaces suitably entitled for an individual record relating to each deal and the results of individual play together with spaces for the results of individual and partnership plays substantially as described.

3. A record of the character described consisting of a series of spaces suitably entitled for an individual record relating to each deal and the results of individual play together with spaces for an analysis and summary of the game properly designated by suitable words substantially as described.

In testimony whereof I affix my signature in presence of two witnesses.

JAMES E. RUSSELL.

Witnesses:
PAUL M. PELLETREAU,
ARTHUR M. MANDER.